United States Patent [19]

Tsai et al.

[11] Patent Number: 4,762,908
[45] Date of Patent: Aug. 9, 1988

[54] POLYBENZOXAZOLE FROM ARYLOXY-2,6-NAPHTHALICDIACID

[75] Inventors: Tsu-Tzu Tsai, Dayton; Fred E. Arnold, Centerville, both of Ohio

[73] Assignee: The United States of America as represented by the Secretary of the Air Force, Washington, D.C.

[21] Appl. No.: 35,339

[22] Filed: Apr. 7, 1987

Related U.S. Application Data

[62] Division of Ser. No. 852,698, Apr. 16, 1986, Pat. No. 4,709,006.

[51] Int. Cl.$^4$ ............................................. C08G 73/22
[52] U.S. Cl. ................................... 528/185; 528/183
[58] Field of Search ............... 548/324, 217; 528/185, 528/183

[56] References Cited

U.S. PATENT DOCUMENTS 3,985,763 10/1976 Harnisch ............................ 548/217

4,709,006 11/1987 Tsai et al. ............................ 528/337

Primary Examiner—Harold D. Anderson
Attorney, Agent, or Firm—Charles E. Bricker; Donald J. Singer

[57] ABSTRACT

A polymer having repeating units of the general formula

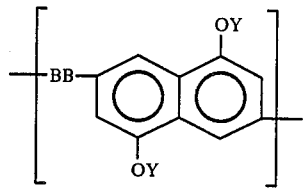

wherein BB is a benzobisaxazole, benzobisthiazole or benzobisimidazole group and Y is a phenolic, pyridyl or phenoxyphenyl group.

1 Claim, No Drawings

POLYBENZOXAZOLE FROM ARYLOXY-2,6-NAPHTHALICDIACID

RIGHTS OF THE GOVERNMENT

The invention described herein may be manufactured and used by or for the Government of the United States for all governmental purposes without the payment of any royalty.

This is a division of application Ser. No. 852,698, filed 4/16/86, now U.S. Pat. No. 4,709,006.

BACKGROUND OF THE INVENTION

This invention relates to polymers, and in particular to p-benzobisoxazole, p-benzobisthiazole and p-benzobisimidazole polymers which contain 2,6-naphthalic segments.

Considerable research efforts in recent years have been directed toward the synthesis of extended chain or rod-like polymers. The unique ordering properties of these polymers into liquid crystalline solutions has led to the preparation of extremely high modulus/high strength fibers.

It is an object of the present invention to provide novel p-benzobisoxazole, p-benzobisthiazole and p-benzobisimidazole polymers.

It is another object of the present invention to provide novel monomers useful in preparing the above polymers.

Other objects and advantages of the present invention will become apparent to those skilled in the art upon consideration of the following disclosure.

SUMMARY OF THE INVENTION

In accordance with the present invention there is provided a novel polymer having repeating units of the general formula

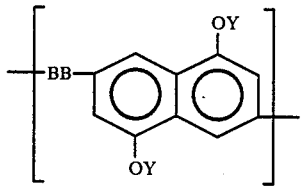

wherein BB is

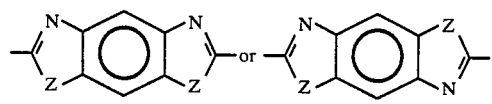

Y is

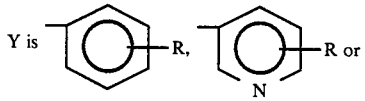

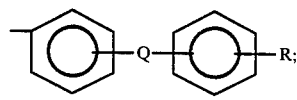

Z is =NH, —O— or —S—, R is —H or a C1 to C3 alkyl group, and Q is —O— or —S—.

Also provided in accordance with the inventions are novel monomers having the formula

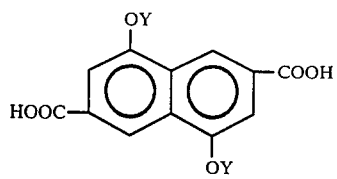

wherein Y is as described above.

DETAILED DESCRIPTION OF THE INVENTION

In one embodiment, the invention resides in novel 4,8-disubstituted-2,6-naphthalene dicarboxylic acid monomers. These monomers are prepared as illustrated by the following equations:

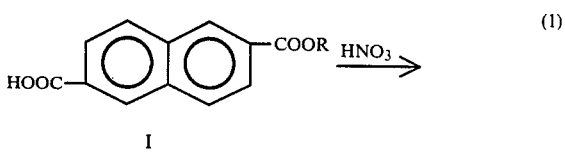

(1)

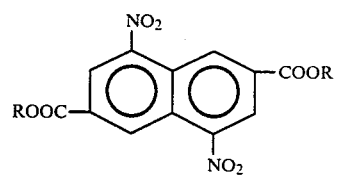

II

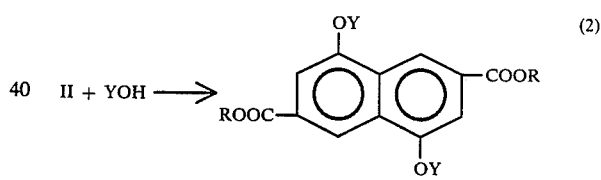

(2)

III

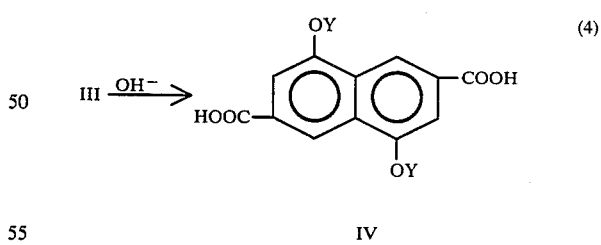

(4)

IV

In the foregoing equations, R and Y are as described previously.

Nitration of the naphthalene dicarboxylic acid ester as shown in equation (1) is conventional. It is known in the art that aromatic compounds can be nitrated using a mixture of sulfuric and nitric acids. The di-nitrated product is isolated by conventional techniques.

The dinitro dicarboxylate product (II) is reacted with an aromatic or heterocyclic phenol as shown in equation (2) in a suitable solvent, such as, for example DMSO, in the presence of a suitable weak base, such as, for example, potassium carbonate. The reactants and the weak base are added to the desired solvent in a suitable container, and heated to reaction temperature, generally about 75° to 150° C. with stirring for about 5 to 50 hours. Reaction onset and progress may be monitored by suitable means, such as by TLC. The diester (III) is hydrolyzed to the diacid (IV) by conventional techniques.

The polymers of this invention are prepared by the polycondensation of 4,6-diaminoresorcinol dihidrochloride, 2,5-diaminohydroquinone dihydrochloride, 4,6-diamino-1,3-benzenedithiol dihydrochloride, or 2,5-diamino-1,4-benzenedithiol dihydrochloride or 1,2,4,5-tetraaminobenzene tetrahydrochloride and one of the difunctional naphthenic monomers discussed above. The condensation reactions involved are illustrated by the following equations

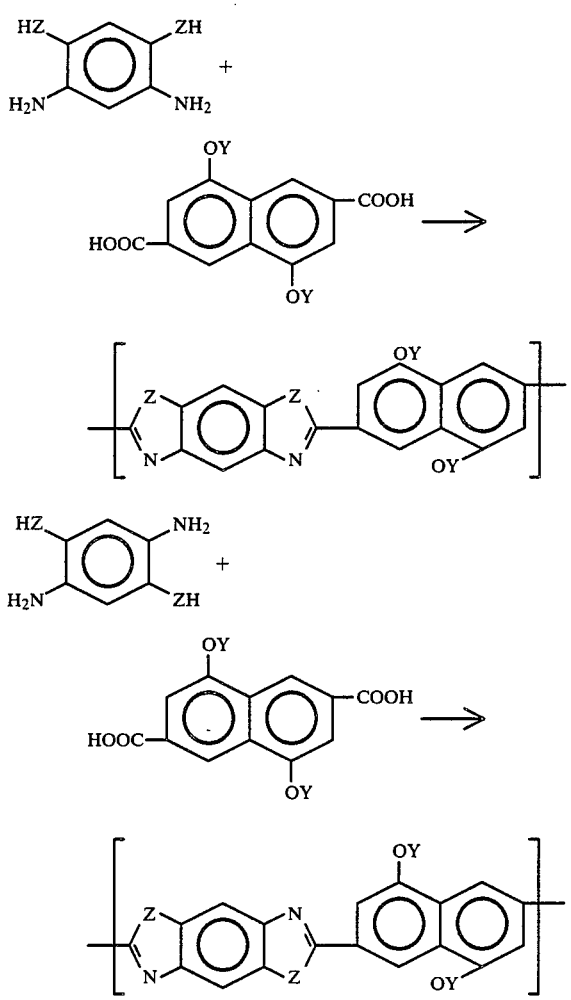

In the foregoing equations, Z and Y are as defined previously.

In conducting the process, the diamino dihydrochloride monomer is mixed with polyphosphoric acid. The mixture is heated, under vacuum or an inert gas atmosphere to about 70° to 130° C. over a period of about 3 to 24 hours, to dehydrochlorinate the diamino monomer. At the end of this period, the difunctional naphthenic monomer is added. An additional amount of phosphorous pentoxide and/or PPA may be added as required to provide a stirrable mixture. An equimolar amount of the naphthenic monomer as compared to the diamino monomer is generally used. The amount of PPA used is that which is sufficient to provide a stirrable mixture. In general, the concentration of monomers in the acid usually ranges from about 0.5 to 12.0 percent.

The reaction mixture is heated at a temperature in the range of about 75° to 225° C. for a period ranging from 24 to 96 hours. Preferably, the polymerization is carried out by stages, i.e., a step-wise heating schedule is employed. Step-wise heating is preferred because immediately exposing the reaction mixture to relatively high polymerization temperatures may cause decomposition of the monomers. The selection of a particular step-wise heating schedule is obvious to one of ordinary skill in the art. At the end of the reaction period, the polymer solution is in a very viscous or semi-solid state. After cooling, the product is washed repeatedly with water while stirring, after which it is dried under a high vacuum at an elevated temperature.

The molecular weight of these polymers is commonly indicated by the inherent viscosity of the polymer. The inherent viscosity is commonly determined at a concentration of 0.2 weight/volume percent in methanesulfonic acid at 25° C.

The polymers produced in accordance with the process of the present invention may be used to produce fibers and sheets. In order to form these polymers into fibers or sheets, dopes are prepared containing about 5 to 15 weight percent of the polymer in a strong acid, such as sulfuric acid, methanesulfonic acid, chlorosulfuric acid, and the like, including mixtures thereof. Such dopes may be spun or extruded into a coagulation bath comprising water or a water/methanesulfonic acid mixture.

The following examples illustrate the invention:

EXAMPLE I 4,8-di(m-phenoxyphenoxy)-2,6-naphthalene dicarboxylic acid

To a 3-neck flask equipped with stirrer, nitrogen inlet/outlet tubes and condenser was added 40.0 g (0.22 mole) of m-phenoxyphenol, 50.0 g of anhydrous potassium carbonate and 200 ml of DMSO. The mixture was stirred and heated in an oil bath under nitrogen for 30 min., after which, 25.0 g (0.075 mole) of 4,8-dinitro-2,6-dimethyl naphthalene dicarboxylate was added. The reaction, as monitored by TLC in methylene chloride solvent was found to begin at 85° C. and progressed to completion at this temperature in 24 hours. The reaction mixture was then cooled, added to water and extracted with toluene. The impure product from the toluene extraction was column chromatographed twice using methylene chloride as the elutant. Yield: 5.8 g (12.6%). mp 162°–4° C.

Analysis Calc'd for $C_{38}H_{28}O_8$: C, 74.50; H, 4.61 Found: C, 74.04; H 4.64.

To a 1-liter flask containing 500 ml of 4% KOH solution was added the dicarbonoxylate obtained above. The mixture was heated to reflux, with stirring, until a clear solution was obtained. The hot solution was treated with charcoal, filtered and then acidified with HcL to provide 2.0 g of the diacid, which was then recrystallized from DMAC.

Analysis Calc'd for $C_{36}H_{24}O_8$: C, 73.97%; H, 4.14%. Found: C, 73.54%; H, 4.15%.

4,8-di(p-phenoxyphenoxy)-2,6-naphthalene dicarboxylic acid, 4,8-di(m-pyridyloxy)-2,6-naphthalene dicarboxylic acid and 4,8-diphenoxy-2,6-naphthalene dicarboxylic acid were synthesized generally following the procedure given above.

Example II

A slurry of 0.8532 g (0.0035 mole) of 2,5-diamino-1,4-benzenedithio dihydrochloride and 4.6 g of 85% polyphosphoric acid was stirred under vacuum at 85° C. until the solution became clear; indicating completion of dehydrochlorination. 1.40 g (0.0035 mole) of 4,8-di(m-pyridyloxy)-2,6-naphthalene dicarboxylic acid was added to the solution and the resultant mixture heated under nitrogen at 85° C. for 3 hours with stirring. The mixture was cooled to about 50° C., then 7.80 g of $P_2O_5$ was added. The reaction mixture was then heated under nitrogen with stirring to 90° C. for 3 hours, followed by heating to 170° C. for 24 hours. The polymer was precipitated out in water. Yield: 1.63 g. Inh. visc. 2.25 dl/g.

Analysis Calc'd for ($C_{28}H_{14}N_4S_2O_2$): C, 66.91; H, 2.81; N, 11.15; S, 12.76; Found: C, 63.79; H, 2.71; N, 10.77; S, 12.70.

Various modifications may be made without departing from the spirit of the invention or the scope of the appended claims.

We claim:

1. A polymer having repeating units of the formula

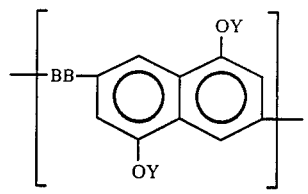

wherein BB is

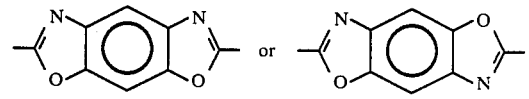

Y is

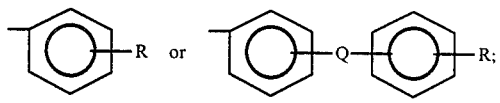

R is —H or a $C_1$ to $C_3$ alkyl group, and Q is —O— or —S—.

* * * * *